G. T. STRONG.
Apparatus for Enriching and Economizing Coal-Gas.

No. 225,435. Patented Mar. 9, 1880.

WITNESSES:
Francis McArdle.
C. Sedgwick

INVENTOR:
G. T. Strong
BY Munn & Co
ATTORNEYS.

UNITED STATES PATENT OFFICE.

GEORGE T. STRONG, OF PORT HOPE, ONTARIO, CANADA.

APPARATUS FOR ENRICHING AND ECONOMIZING COAL-GAS.

SPECIFICATION forming part of Letters Patent No. 225,435, dated March 9, 1880.

Application filed June 16, 1879.

*To all whom it may concern:*

Be it known that I, GEORGE TIMOTHY STRONG, of Port Hope, in the Province of Ontario and Dominion of Canada, have invented a new and Improved Apparatus for Enriching and Economizing Coal-Gas, of which the following is a specification.

The invention consists in an apparatus for enriching and economizing coal-gas, formed of a hydrocarbon-vessel having cover, a central glass tube opening through a dome and closed at upper end, a hollow float having central tube open at both ends, a hollow extension provided with needles, perforated tubes closed at upper and open at lower end, and outlet as well as inlet tubes, all as hereinafter described.

Figure 1:
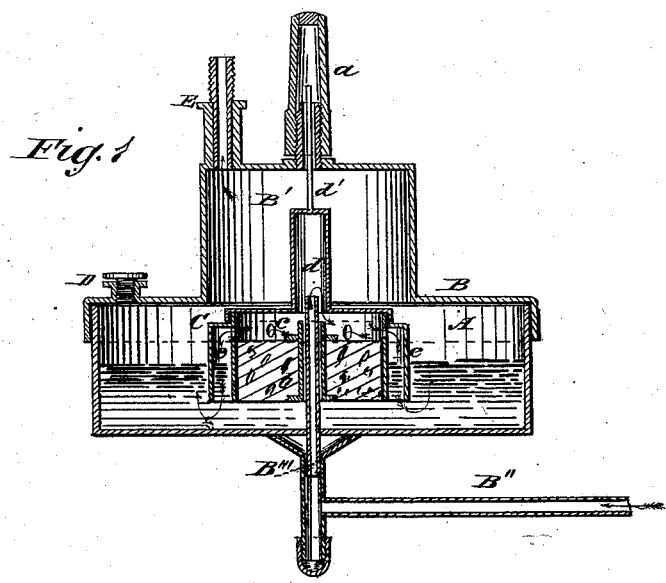
Figure 2:
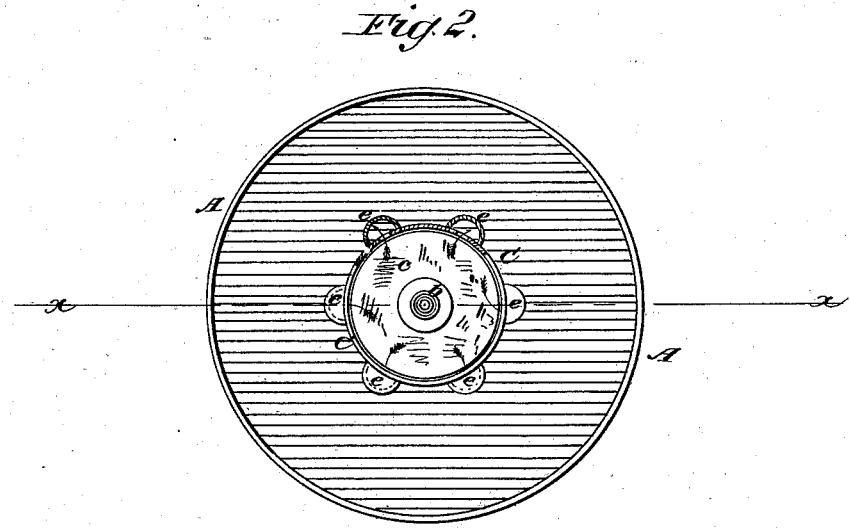

In the accompanying drawings, Figure 1 represents a sectional elevation, on line $x\,x$, of the apparatus; and Fig. 2 is a plan of the interior of the same, the top being removed.

Similar letters of reference indicate corresponding parts.

Referring to the drawings, A is a liquid-tight vessel, of any suitable shape or material, partially filled with a liquid hydrocarbon, as indicated by the dotted lines. B is the cover of the vessel, from the top whereof rises a dome, B', and in the center of this is placed a glass tube, $a$, closed at the upper end, but opening through the dome. C is the hollow float, having a cork bottom, in the center of which is a tube, $b$, open at both ends. Above the cork bottom is a chamber, $c$, and from the top of the float rises a hollow extension, $d$, carrying a needle, $d'$, which reaches up into the glass tube, so that the rising and falling of the float, as indicated by the position of this needle, are plainly visible through the tube. Chamber $c$ communicates, through suitable perforations, with the tubes $e$, arranged around the float, closed at the upper end and open at the lower, under the surface of the liquid.

B'' is a gas-pipe leading from the meter and connecting with a tube, B''', passed up through the bottom of the vessel and into the tube $b$, opening above the top of the same into the chamber $c$. The tube B''' fits easily in tube $b$, so as to offer no obstacle to the easy movement of the float up and down with the liquid.

D is a filling-tube provided with a suitable cap, through which the liquid is poured into the vessel. E is a tube opening into the chamber above the liquid, to carry the gas to the distributing house-pipes.

The float rises and falls freely as the depth of the liquid varies; but the weight of the float remaining the same, its displacement is not affected by the quantity of liquid in the vessel; consequently the gas ejected into it from the float will always have the same amount of liquid to rise through, thereby insuring uniformity in both the pressure and the quality of the gas supplied. The gas conveyed to the float passes thence into the tubes $e$, and is ejected into the liquid, and rises up through the liquid, as indicated by the arrows, into the space above, and passes thence into tube E, for distribution to the burners.

The carbureting of the gas by its passage through the liquid greatly enriches it, whereby a more brilliant light is produced and a much reduced consumption of the gas is effected.

I am aware that air has been forced into a float and thence through hydrocarbon; also, that a bell-shaped float has been suspended over a cylinder, and from which the air passes down between the float and cylinder into the liquid; also, that a needle has been used in connection with a float and projecting into a tube; but my apparatus has a different object in view—namely, to economize coal-gas, while the upper chamber holds gas in sufficient quantity to act as a cushion for the coal-gas from the meter, so as to render the light steady and the illuminating-power uniform.

What I claim as new and of my invention is—

The herein-described apparatus for enriching and economizing coal-gas, consisting of hydrocarbon-vessel A, having cover B, the central glass tube, $a$, passing through dome B' and closed at upper end, the hollow float C, having central tube, $b$, open at both ends, a chamber, $c$, and a hollow extension, $d$, with needle $d'$, the perforated tubes $e$, closed at upper and open at lower end, the tubes B'' B''', and the tubes D E, all as shown and described, for the purpose of first passing the gas into the float and then ejecting it from the same, so that it will pass up through the liquid into the distributing-pipes, as specified.

GEORGE TIMOTHY STRONG.

Witnesses:
JNO. THOS. MONTGOMERY,
EDMUND S. VINDIN.